United States Patent
Sywak

(10) Patent No.: US 9,097,383 B2
(45) Date of Patent: Aug. 4, 2015

(54) MOTION PLATFORM CONFIGURATION

(71) Applicant: Oceaneering International, Inc., Houston, TX (US)

(72) Inventor: Stephen Alan Sywak, Glen Burnie, MD (US)

(73) Assignee: OCEANEERING INTERNATIONAL, INC., Houston, TX (US)

( * ) Notice: Subject to any disclaimer, the term of this patent is extended or adjusted under 35 U.S.C. 154(b) by 0 days.

(21) Appl. No.: 14/206,030

(22) Filed: Mar. 12, 2014

(65) Prior Publication Data

US 2014/0261092 A1 Sep. 18, 2014

Related U.S. Application Data

(60) Provisional application No. 61/799,146, filed on Mar. 15, 2013.

(51) Int. Cl.
| | |
|---|---|
| *A63G 31/04* | (2006.01) |
| *F16M 11/18* | (2006.01) |
| *A63G 31/16* | (2006.01) |
| *F16M 11/04* | (2006.01) |
| *F16M 11/12* | (2006.01) |

(52) U.S. Cl.
CPC .............. *F16M 11/18* (2013.01); *A63G 31/04* (2013.01); *A63G 31/16* (2013.01); *F16M 11/043* (2013.01); *F16M 11/12* (2013.01)

(58) Field of Classification Search
CPC ............. A63G 1/00; A63G 1/10; A63G 1/24; A63G 1/30; A63G 19/20; A63G 31/00; A63G 31/02; A63G 31/10; A47C 1/00; A47C 1/12; A63F 13/00; A63F 13/12; A63F 13/803
USPC .......... 472/59, 60, 61, 130, 131, 136; 434/29, 434/55, 59
See application file for complete search history.

(56) References Cited

U.S. PATENT DOCUMENTS

| | | | | |
|---|---|---|---|---|
| 5,605,462 | A * | 2/1997 | Denne | 434/55 |
| 5,980,256 | A * | 11/1999 | Carmein | 434/55 |
| 6,354,838 | B1 * | 3/2002 | Tagge et al. | 434/62 |
| 7,094,157 | B2 | 8/2006 | Fromyer et al. | |
| 2005/0048446 | A1 | 3/2005 | Fromyer et al. | |
| 2006/0222539 | A1 | 10/2006 | Hetherington et al. | |
| 2007/0059668 | A1 * | 3/2007 | Mallaci et al. | 434/29 |
| 2011/0177873 | A1 | 7/2011 | Sebelia et al. | |
| 2013/0144468 | A1 | 6/2013 | Foster et al. | |

FOREIGN PATENT DOCUMENTS

| | | |
|---|---|---|
| WO | 9301577 A1 | 1/1993 |
| WO | 2012155120 A1 | 11/2012 |

* cited by examiner

*Primary Examiner* — Kien Nguyen
(74) *Attorney, Agent, or Firm* — McKenna Long & Aldridge LLP

(57) ABSTRACT

An improved motion platform configuration having a particular alignment configuration of the components which include a plurality of active devices, such as linear actuators, and a plurality of transducers, such as passive transducers. The particular alignment configuration of components simplifies computations that are based on the output signals from the transducers, thus providing better support for high speed motion platform applications.

19 Claims, 8 Drawing Sheets

MOTION PLATFORM CONFIGURATION

This application claims priority to U.S. Provisional Application No. 61/799,146, filed Mar. 15, 2013, which is hereby incorporated by reference in its entirety.

FIELD OF THE INVENTION

The present invention relates motion platforms that employ active devices, e.g., linear actuators, for inducing platform motion. More particularly, the present invention relates to the use of transducers (e.g., passive transducers) for the purpose of controlling the orientation and/or position of the motion platform and for the purpose of preventing the active devices from extending or retracting beyond their operational limits and, in turn, protecting the motion platform and any load being carried by the motion platform.

BACKGROUND

Motion platforms are used in a wide variety of applications. For example, motion platforms may be used in vehicle simulators (e.g., aircraft simulators) for training purposes as well as recreational purposes. As explained in US Patent Publication No. 2006/0222539, a motion platform may be moved about its one or more axes by operation of one or more actuators positioned beneath the motion platform, as illustrated in FIG. 1 of the publication. Also, as explained in the publication, transducers may be employed for determining the position of or the orientation of the motion platform.

Each transducer in US Patent Publication 2006/0222539 is positioned "immediately adjacent to an actuator." A microprocessor then receives and decodes signals from the transducers and, based thereon, calculates the position or the orientation of the motion platform. The calculations can then be used to feedback control signals to the actuators to further control and/or correct the position or orientation of the motion platform.

Each transducer also may be employed to provide end of travel (EOT) protection for the corresponding actuator. As such, each transducer would more specifically provide discrete position sensing for the corresponding actuator in order to determine the degree to which the actuator is extended or retracted and prevent the actuator from operating outside its intended range.

In high speed applications particularly, the microprocessor must receive the output signals from the transducers and make the aforementioned calculations quickly and accurately. This ability is, at least in part, dependent on the complexity of the calculations. In US Patent Publication 2006/0222539, the calculations may be quite complex because the output signal from each transducer is not continuously proportional to the state of the corresponding actuator and, in addition, the output of each actuator will influence the output signal of both transducers due to cross-coupling effects. The microprocessor must then solve for this lack of proportionality and the cross-coupling effects, which may result in a time consuming and complicated computational process.

As mentioned above, there are a variety of applications for which motion platforms are employed. Vehicle simulators are but one example. Another example is amusement rides, such as dark ride vehicles, which are in use at many amusement and/or theme parks around the world. Examples of dark ride vehicles are described and claimed, for example, in U.S. Pat. No. 7,094,157, entitled AMUSEMENT RIDE VEHICLE WITH PNEUMATICALLY ACTUATED CABIN AND MOTION BASE, the entire contents of which are incorporated by reference herein. Other exemplary dark ride vehicles are described and claimed in pending U.S. patent application Ser. No. 13/470,244, entitled TRACKLESS DARK RIDE VEHICLE, SYSTEM, AND METHOD, the entire contents of which are also incorporated by reference herein.

Accordingly, a motion platform configuration is needed where the aforementioned computations are less complex. This will provide better support particularly for high speed motion platform applications.

SUMMARY OF THE INVENTION

The present invention obviates the deficiencies associated with the prior art in that it provides an improved motion platform configuration compared to the prior art. This improved motion platform configuration includes a particular alignment of components including a plurality of active devices (e.g., linear actuators) and corresponding transducers (e.g., passive transducers), such that the aforementioned computations, based on the output signals from the transducers, are simplified compared to the prior art. The improved motion platform configuration described herein provides better support at least for high speed motion platform applications.

One advantage associated with the improved motion platform configuration of the present invention is that the computations necessary to solve motion platform position and/or orientation are accomplished more accurately and efficiently.

Another advantage associated with the present invention is that the improved motion platform configuration provides better support for high speed motion platform applications.

In accordance with one aspect of the present invention, the aforementioned and other advantages are achieved by an apparatus comprising a number of components including a base; a motion platform; a pivot joint positioned between and connected to the base and the motion platform; a plurality of active devices and a plurality of transducers. Each of the plurality of active devices is positioned between and connected to the motion platform at a corresponding first connection point and to the base at a corresponding second connection point. Moreover, each of the plurality of active devices is capable of exerting a force on the motion platform at its corresponding first connection point. Each of the plurality of transducers is positioned between and connected to the motion platform at a corresponding third connection point and to the base at a corresponding fourth connection point. Further, each of the plurality of transducers is aligned with a corresponding one of the plurality of active devices and the pivot joint. Consequently, the third and fourth connection point of each of the plurality of transducers are located in a geometric plane with a pivot point associated with the pivot joint and the first and second connection points of the corresponding one of the plurality of active devices, and an output signal associated with each of the plurality of transducers remains proportional to the length of the corresponding one of the plurality of active devices between its first and second connection points.

In accordance with another aspect of the present invention, the aforementioned and other advantages are achieved by a motion platform system that comprises a base, a motion platform, a universal joint positioned between and connected to the base and the motion platform, a plurality of linear actuators, and a plurality of passive transducers. Each of the plurality of linear actuators is positioned between and connected to the motion platform at a corresponding first connection point and to the base at a corresponding second connection point. Moreover, each of the plurality of linear actuators is capable of exerting a force on the motion platform at its corresponding first connection point. Each of the plurality of passive transducers is positioned between and connected to the motion platform at a corresponding third connection point and to the base at a corresponding fourth connection point. Further, each of the plurality of passive transducers is aligned with a corresponding one of the plurality of linear actuators and the universal joint. Consequently, the third and fourth connection point of each of the plurality of passive transducers are located in a geometric plane with a pivot point associated with the universal joint and the first and second connection points of the corresponding one of the plurality of linear actuators, and an output signal associated with each of the plurality of passive transducers remains proportional to the length of the corresponding one of the plurality of linear actuators between its first and second connection points.

In accordance with yet another aspect of the present invention, the aforementioned and other advantages are achieved by a dark ride vehicle comprising a motion platform system that comprises a base, a motion platform, a universal joint positioned between and connected to the base and the motion platform, a plurality of linear actuators, and a plurality of passive transducers. Each of the plurality of linear actuators is positioned between and connected to the motion platform at a corresponding first connection point and to the base at a corresponding second connection point. Moreover, each of the plurality of linear actuators is capable of exerting a force on the motion platform at its corresponding first connection point. Each of the plurality of passive transducers is positioned between and connected to the motion platform at a corresponding third connection point and to the base at a corresponding fourth connection point. Further, each of the plurality of passive transducers is aligned with a corresponding one of the plurality of linear actuators and the universal joint. Consequently, the third and fourth connection point of each of the plurality of passive transducers are located in a geometric plane with a pivot point associated with the universal joint and the first and second connection points of the corresponding one of the plurality of linear actuators, and an output signal associated with each of the plurality of passive transducers remains proportional to the length of the corresponding one of the plurality of linear actuators between its first and second connection points.

BRIEF DESCRIPTION OF THE DRAWINGS

Several figures are provided herein to further the explanation of the present invention. More specifically.

DETAILED DESCRIPTION OF THE INVENTION

It is to be understood that both the foregoing general description and the following detailed description are exemplary. The descriptions herein are not intended to limit the scope of the present invention. The scope of the present invention is governed by the scope of the appended claims.

Figure 1:
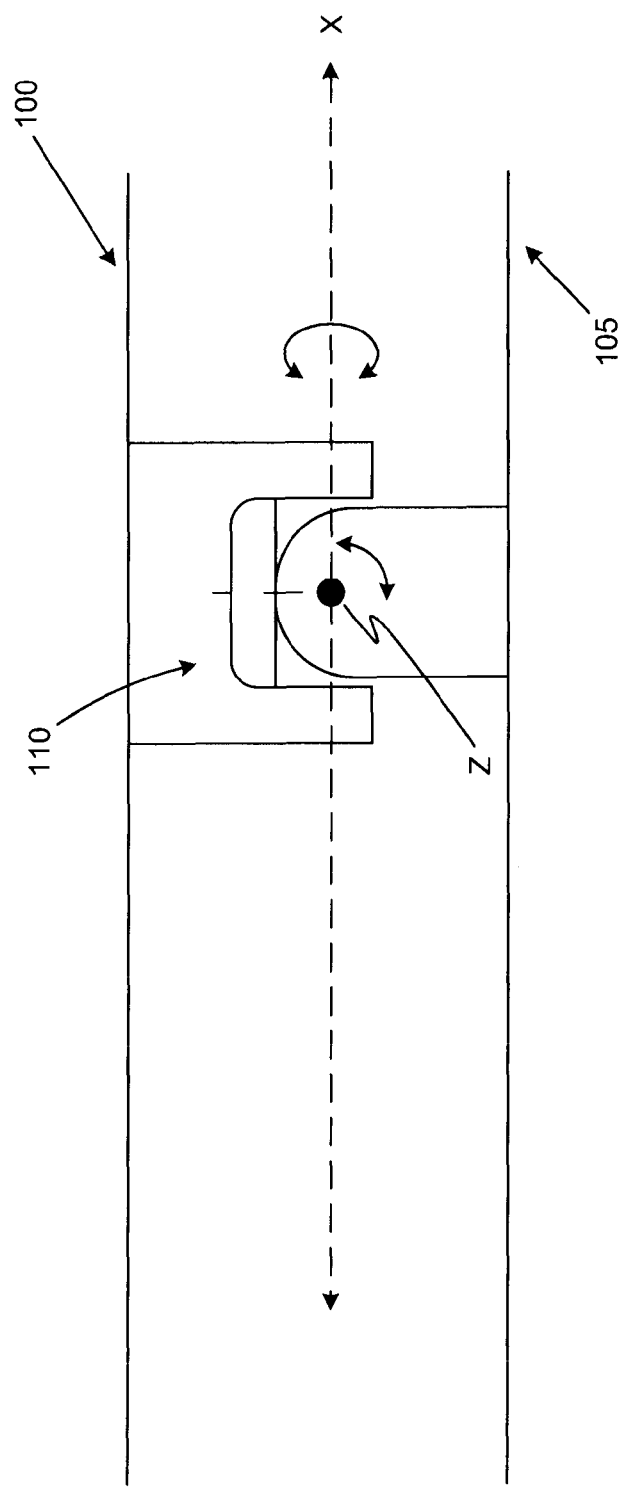
FIG. 1 illustrates an exemplary universal joint (u-joint) operatively coupled to and positioned between a base and a motion platform.

FIG. 1 illustrates a pivot joint (e.g., a u-joint) operatively coupled to and positioned between a base and a motion platform. As shown, the motion platform 100 is able to move relative to base 105. This is achieved, in part, by the u-joint 110, one end of which is connected to the top of the base 105, and a second end of which is connected to the bottom of the motion platform 100. In accordance with exemplary embodiments of the present invention, the u-joint 110 permits the motion platform 100 to at least rotate about a roll axis "x" and a pitch axis "z," where the pitch axis "z" is perpendicular to FIG. 1. U-joints are well known in the art.

Figure 2A:
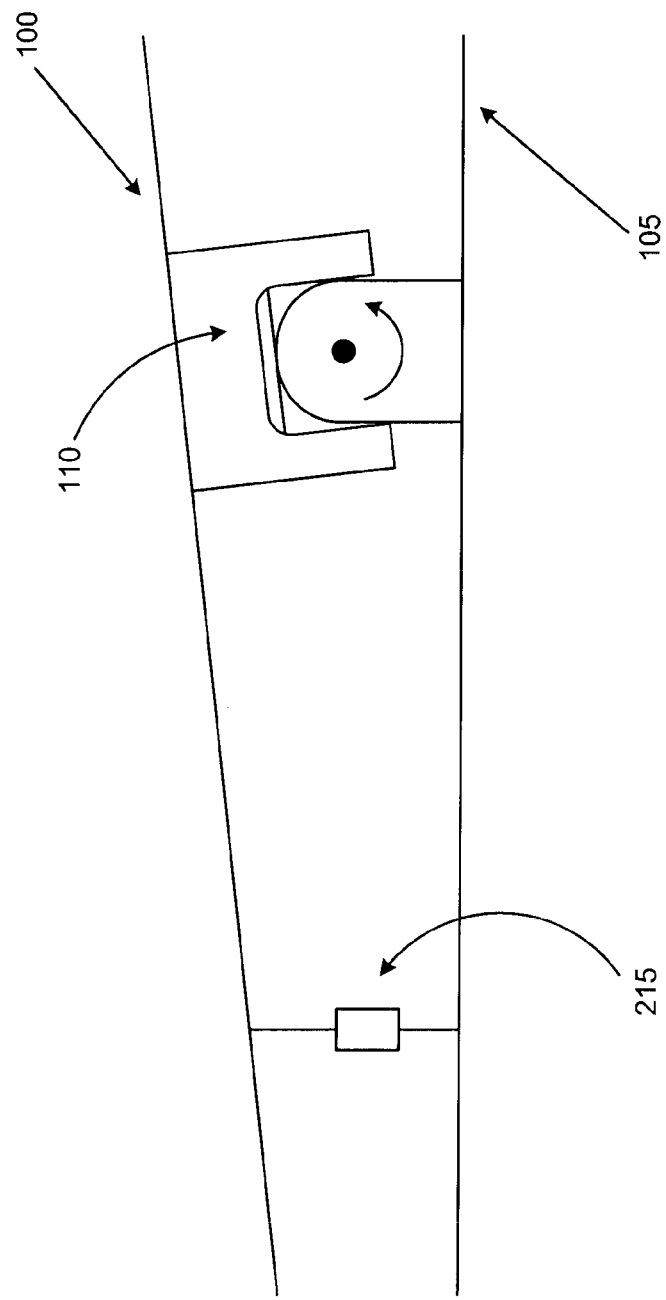
FIGS. 2A and 2B illustrate an active device and a u-joint, where both are coupled to and positioned between a base and a motion platform.
Figure 2B:
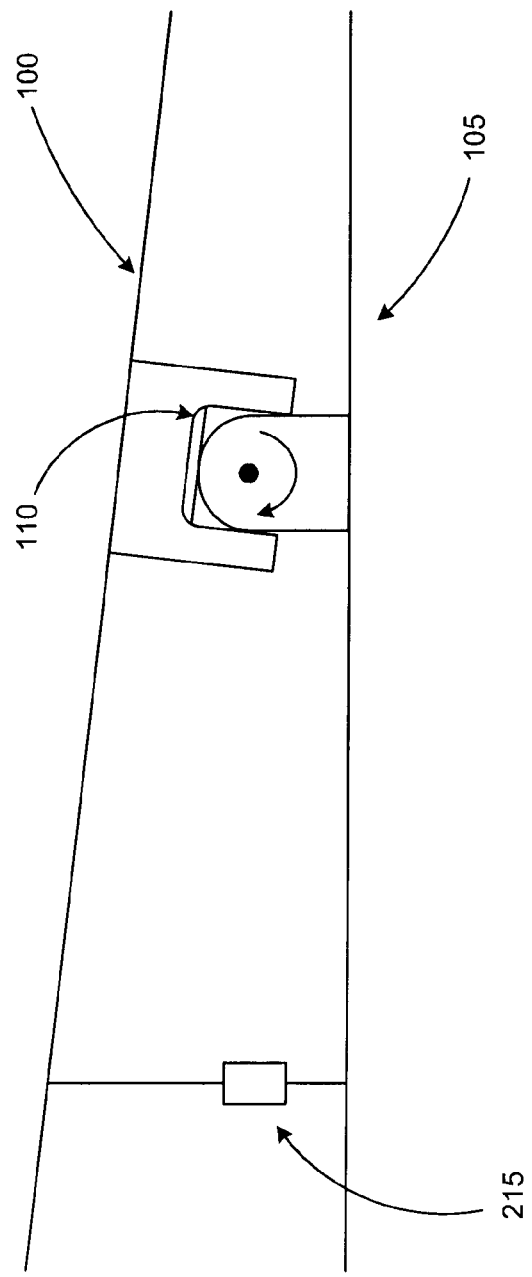

FIGS. 2A and 2B illustrate an exemplary active device and a u-joint, where both are coupled to and positioned between a base and a motion platform. To make the motion platform 100 move, i.e., rotate about the roll axis "x" and/or the pitch axis "z," forces must be applied to the motion platform 100. In accordance with exemplary embodiments of the present invention, this force is supplied by a plurality of active devices 215. For ease of discussion, FIG. 2 is a side view, so that only one of said plurality of active devices 215 is visible. Each of the plurality of active devices 215 are spaced a desired distance "d" from the u-joint 110, as illustrated. The plurality of active devices 215 will be illustrated and described in greater detail below.

Each of the plurality of active devices 215 may be linear actuators, for example, but not limited to pneumatic or hydraulic piston/cylinder type actuators, or electromagnetic or electromechanical actuators. They are referred to herein as "active" devices because they receive an input that results in an output that, in turn, directly acts on another component. In the case of pneumatic or hydraulic piston/cylinder type actuators, the input is typically an electric signal that causes pressurized air or hydraulic fluid, respectively, to drive a piston rod into or out of a cylinder, thereby reducing or increasing the overall length of the actuator. When the rod is being driven into the cylinder, the output is a force acting to pull the motion platform 100 towards the base 105 (FIG. 2A). When the rod is being driven out of the cylinder, the output is a force acting to push the motion platform 100 away from the base 105 (FIG. 2B). As one skilled in the art will readily appreciate, the combined force acting on the motion platform 100 by each of the plurality of active devices 215 will cause the motion platform 100 to rotate a corresponding angular distance about the roll axis "z" and/or the pitch axis "z" by virtue of the u-joint 110. Linear actuators, including pneumatic and hydraulic piston/cylinder type, and electromagnetic and electromechanical type linear actuators are, in and of themselves, well known in the art.

Figure 3:
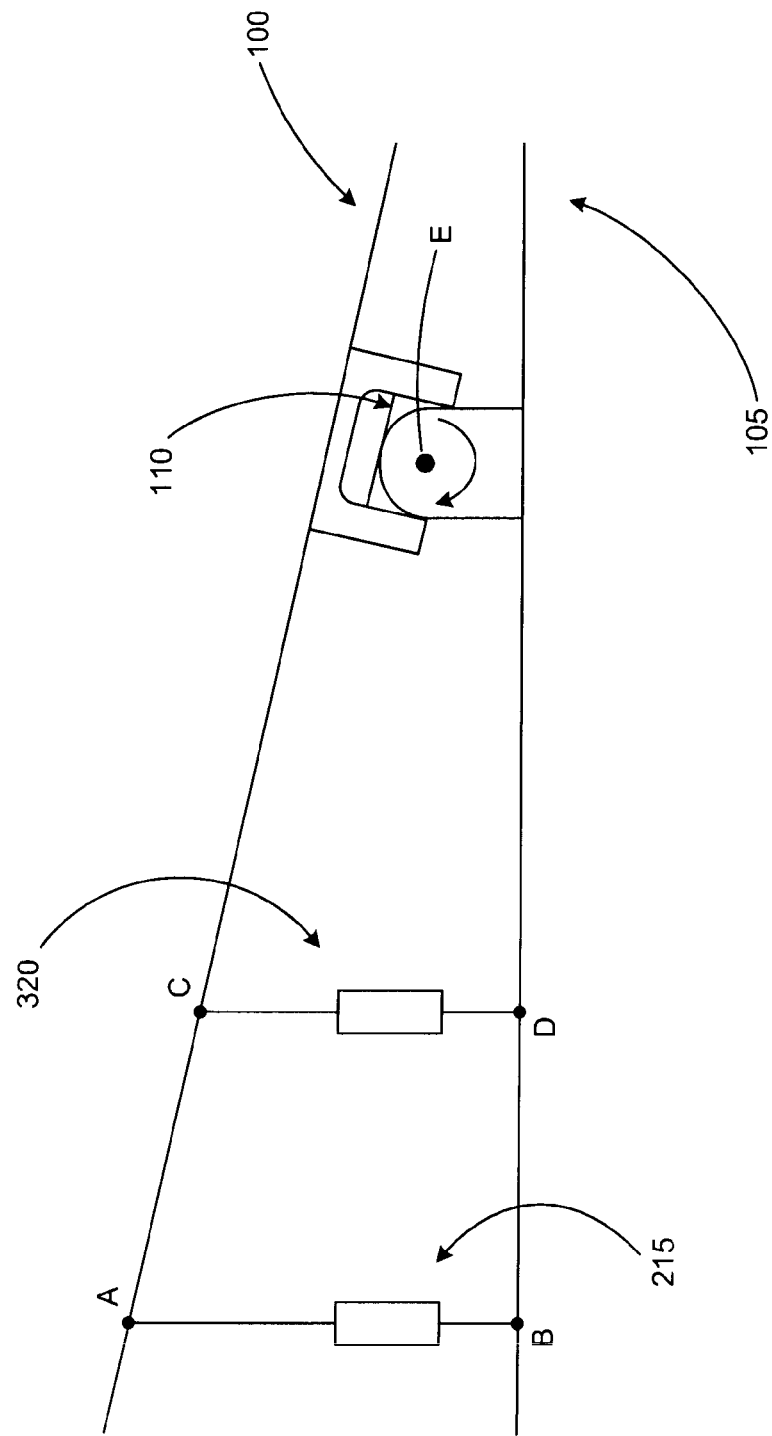
FIG. 3 illustrates an active device, a u-joint and a transducer, all of which are coupled to and positioned between a base and a motion platform.

FIG. 3 illustrates an exemplary active device, a u-joint and a transducer, all of which are coupled to and positioned between a base and a motion platform. In accordance with exemplary embodiments of the present invention, each of a plurality of transducers 320 (e.g., passive transducers) is aligned with the u-joint 110 and a corresponding one of the plurality of active devices (e.g., linear actuators). FIG. 3 is also a side view and, therefore, only one of the plurality of active devices 215 and only one of the plurality of transducers 320 are illustrated.

FIG. 3 also illustrates that each one of the plurality of transducers 320 is aligned with the u-joint 110 and a corresponding one of the plurality of active devices 215 such that the connection points A, B (between the active device, motion platform and base) and connection points C, D (between the transducer, motion platform and base) fall in the same geometric plane as does the pivot point E of u-joint 110. In accordance with the present invention, this particular alignment of each active device 215, its corresponding transducer 320 and the pivot point E of u-joint 110 is very important and it provides a significant benefit.

The reason the above-described alignment configuration is important is that no matter how the motion platform 100 moves, i.e., rotates about the roll axis "x" and/or the pitch axis "z," the state of each transducer 320 remains proportional to the state of the corresponding active device 215. Where the active devices 215 are pneumatic or hydraulic linear piston/cylinder type actuators, the position of the rod within the cylinder of each actuator compared to the output of the corresponding transducer 320 remains proportional. This, in turn, is important because any computation that is based on the output of each transducer 320 is significantly simplified, whether the computation is used to provide feedback signals for controlling the position and/or orientation of the motion platform 100 or for protecting the active devices 215 from exceeding their operational range. As stated above, simplifying this computation is important particularly in high speed applications such as vehicle simulators and theme park attractions.

Figure 4:
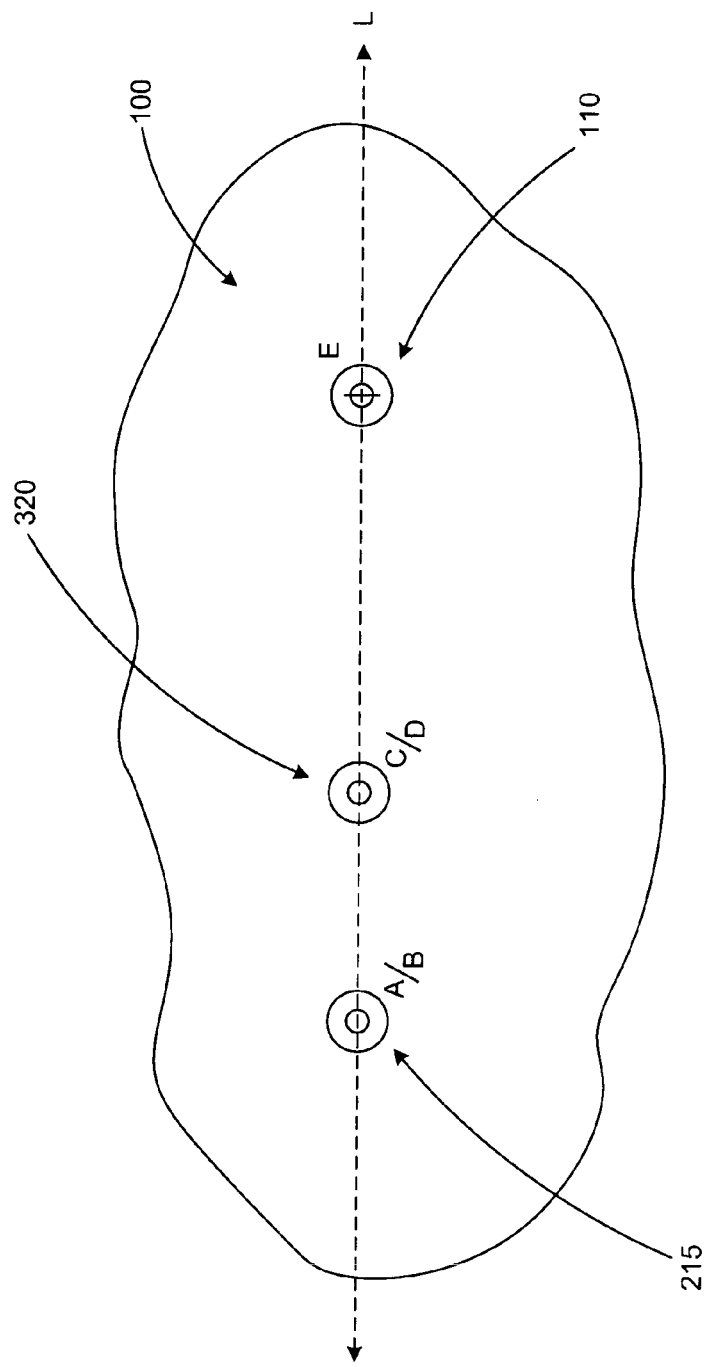
FIG. 4 illustrates the relative positioning of the active device, u-joint and transducer of FIG. 3.

FIG. 4 is a top-down view of FIG. 3, and further illustrates the relative positioning of an active device, a corresponding passive transducer and the u-joint, in accordance with exemplary embodiments of the present invention. As previously described, the aforementioned connection points A, B, C and D and the pivot point E of the u-joint 110 all fall in the same geometric plane. Thus, as illustrated in the top-down view of FIG. 4, each active device 215, its corresponding transducer 320 and the u-joint 110 appear to be arranged in a linear configuration along line L.

In a preferred embodiment, each of the transducers 320 is positioned between the corresponding active device 215 and the u-joint 110, as illustrated in FIG. 3 and FIG. 4. The specific location of each transducer 320 in this embodiment may depend on such factors as size, cost and the location of other components associated with the motion platform 100.

However, alternative embodiments are possible. In one alternative embodiment, each of the plurality of active devices 215 are positioned between the corresponding transducer 320 and the u-joint, as long as the aforementioned connection points A, B, C and D are in the same geometric plane as the pivot point E of u-joint 110. In a second alternative embodiment, the pivot point E of u-joint 110 is positioned between each of the plurality of active devices 215 and its corresponding transducer 320, as long as the aforementioned connection points A, B, C and D are in the same geometric plane as the pivot point E of u-joint 110. In a third alternative embodiment, the relative positioning of each of the plurality of active devices 215 with its corresponding transducer 320 and the u-joint may vary, as long as the aforementioned connection points A, B, C and D are in the same geometric plane as the pivot point E of u-joint 110. In accordance with the third alternative embodiment, the computation based on the output of one transducer may be different from the computation based on the output of another transducer, due to the fact that the two transducers have different positions relative to the corresponding active device. Nevertheless, the computations are simplified as long as the aforementioned connection points A, B, C and D are in the same geometric plane as the pivot point E of u-joint 110.

Figure 5:
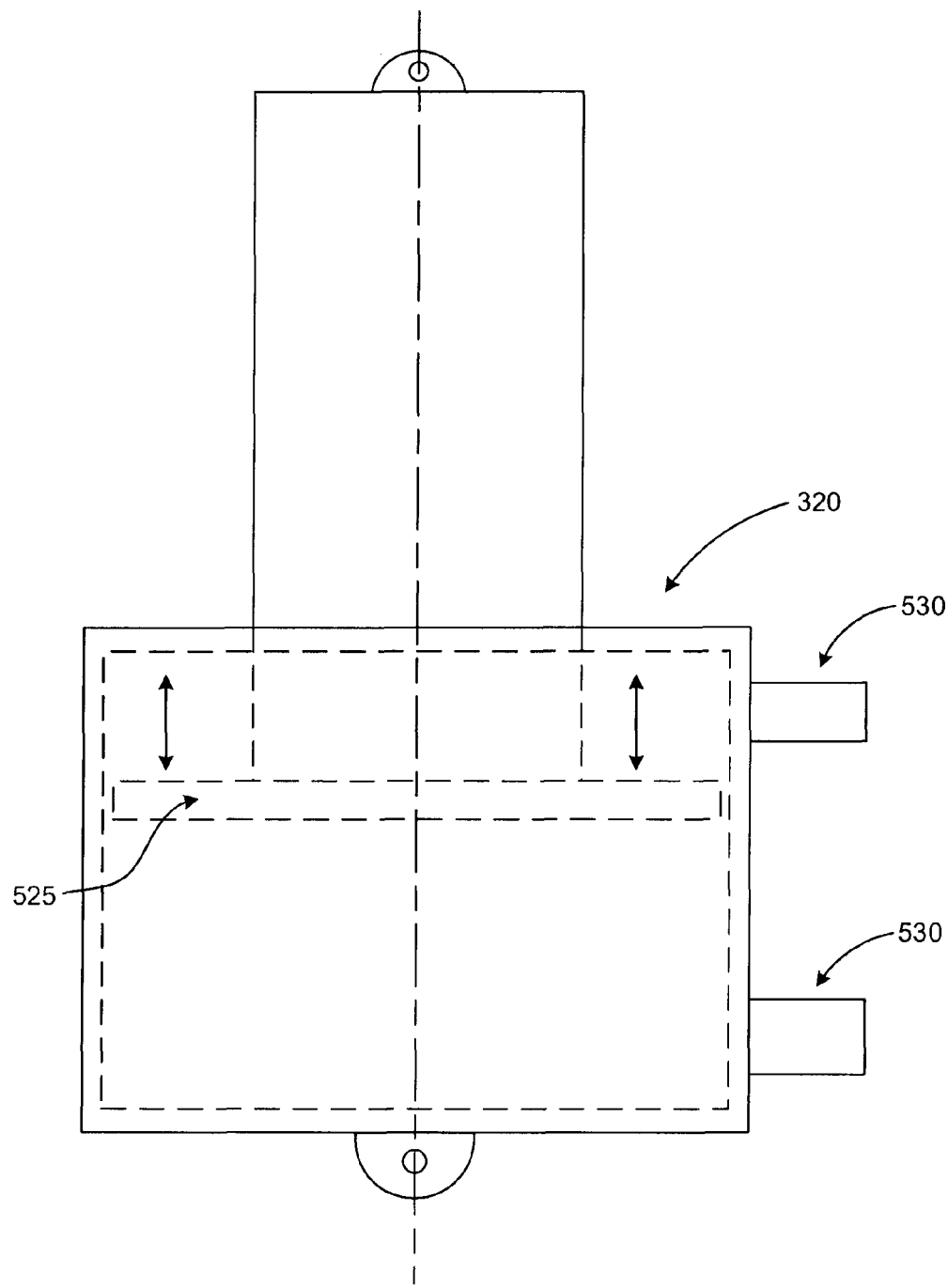
FIG. 5 illustrates an exemplary passive transducer.

FIG. 5 illustrates an exemplary one of the plurality of transducers 320. As shown, the exemplary transducer 320 comprises a magnetic element 525 and a pair of sensors 530. The magnetic element 525 is capable of moving back and forth between the sensors 530 by virtue of a piston 535 which moves back and forth due to the movement of the motion platform 100 to which the transducer 320 is connected, as described above.

Each of the sensors 530 is capable of detecting the magnetic field produced by the magnetic element 525 when the magnetic element 525 is in close proximity to the sensor. Each sensor 530 is also capable of outputting an electric signal (e.g., a voltage or current) when the magnetic field is detected or the magnitude of the magnetic field exceeds a pre-determined threshold. Thus, when the magnetic element 525 is in close proximity to the upper sensor, the upper sensor will generate an electric output signal. Conversely, when the magnetic element 525 is in close proximity to the lower sensor, the lower sensor will generate an electric output signal. Because the position of the magnetic element 525 is a function of the length of the corresponding active device 215, the transducer 320 can be calibrated such that the electric output signal generated by one sensor may indicate that the length of the corresponding active device 215 is at or approaching one end of its operational range (e.g., maximum extension), and wherein the electric output signal generated by the other sensor may indicate that the length of the active device 215 is at or approaching the other end of its operational range (e.g., maximum retraction).

If the primary function of each passive transducer 320 is to prevent the corresponding active device 215 from exceeding its operational range, then the passive transducer 320 illustrated in FIG. 5, as described above, is appropriate. If the primary function of the passive transducer 320 is to provide position and/or orientation feedback control for the motion platform 100, other types of passive transducers may be preferred, such as, but not limited to linear potentiometers, linear optical (incremental or absolute), linear-to-rotary (incremental or absolute), magneto-restrictive (absolute), ultrasonic (absolute), magnetic encoded (incremental or absolute), laser interferometer (absolute), capacitive absolute, inductive absolute and eddy current type transducers.

In accordance with a preferred embodiment of the present invention, the transducers 320 are passive devices. As such, the transducers 320 are, herein below, referred to as passive transducers. The transducers 320 are passive because they do not receive an input signal, as do the active devices 215, and they play no part in exerting any force on the motion platform 100, as do the active devices 215. Passive transducers, such as the one illustrated in FIG. 5, are generally well known in the art. It will be understood, however, that the scope of the present invention is not limited to the use of passive transducers, as some transducers that require power to operate could be employed as an alternative to the passive transducers described above.

Figure 6:
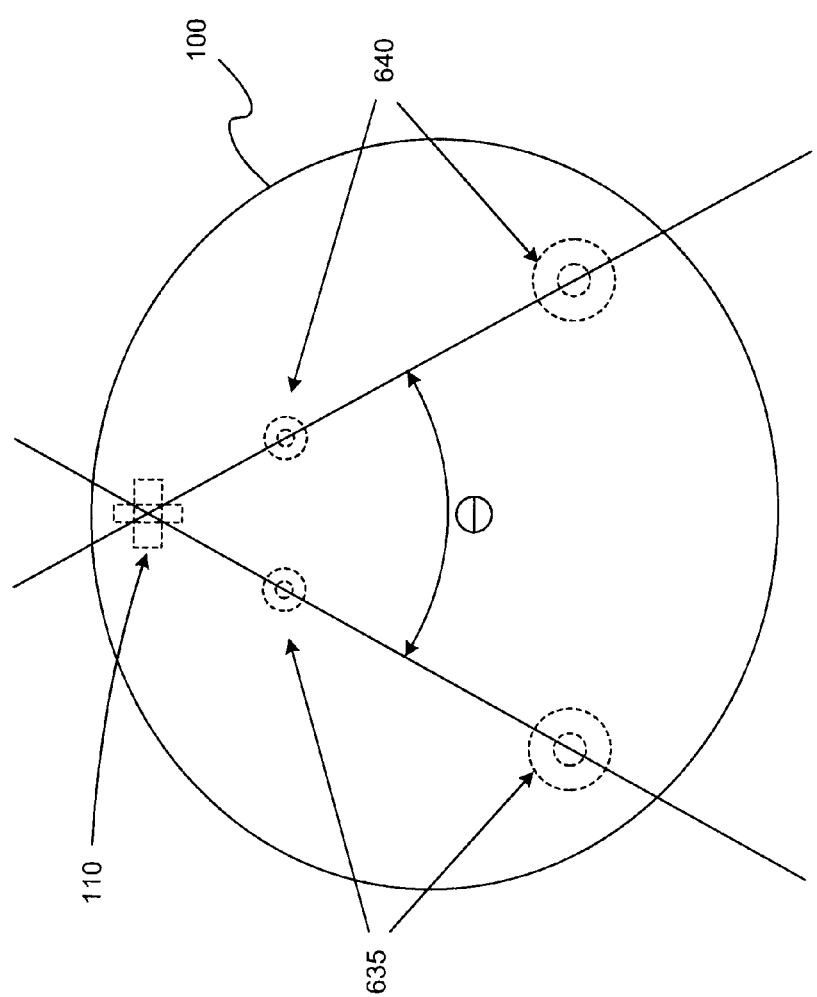
FIG. 6 is a top-down view illustrating the relative positioning of a first active device, transducer pair; a second active device, transducer pair and a u-joint, all of which are operatively coupled to and positioned between a base and a motion platform.
Figure 7:
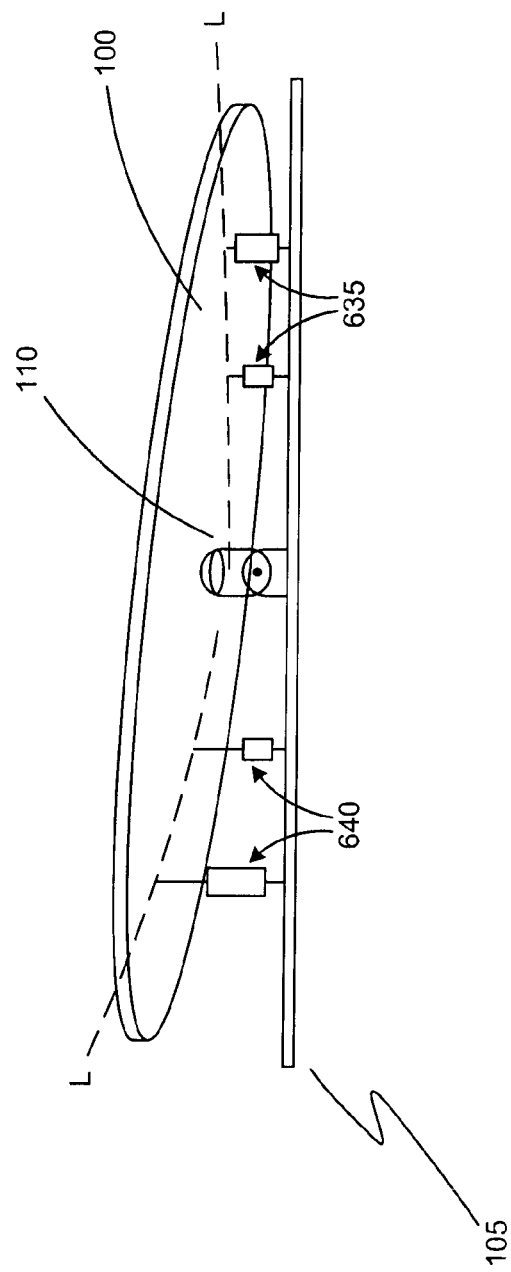
FIG. 7 is a perspective view illustrating the relative positioning of the first active device, transducer pair; the second active device, transducer pair and u-joint, of FIG. 6, all of which are operatively coupled to and positioned between a base and a motion platform.

FIG. 6 is a top-down view illustrating the relative positioning of a first active device, passive transducer pair (hereafter "first pair 635"); a second active device, passive transducer pair (hereafter "second pair 640") and a u-joint 110, all of which are operatively coupled to and positioned between a base and a motion. FIG. 7 is a perspective view of first pair 635, second pair 640 and the u-joint 110 illustrated in FIG. 6.

FIGS. 6 and 7 illustrate a preferred embodiment of the present invention in terms of the number of active devices and passive transducers. In other words, there are two active device, passive transducer pairs in a preferred embodiment. However, the scope of the present invention is not limited thereto.

As shown in the figures, each of the plurality of active devices 215 are aligned with a corresponding one of the plurality of passive transducers 320 and the u-joint 110, such that each of the first pair 635 and the second pair 640 aligns in a linear configuration with the u-joint 110 in the top-down view, as illustrated in FIG. 6. Because each pair 635 and 640 must align with the u-joint 110 in a linear configuration, the line L passing through the first pair 635 is separated by an angle θ from the line L' passing through the second pair 640.

In FIGS. 6 and 7, the shape of the motion platform 100 is shown as being circular. However, the present invention is not limited to any particular motion platform shape. When the active device of the first pair 635 and the active device of the second pair 640 extend (i.e., increase in length) by the same amount, the motion platform 100 will rotate about the pitch axis "z." When the active device of the first pair 635 and the active device of the second pair 640 extend or retract in direct opposition (i.e., one extends by the same amount the other retracts), the motion platform 100 will rotate purely about the roll axis "x." When the active device of the first pair 635 or the active device of the second pair 640 extends or retracts while the other does not extend or retract, the motion platform 100 will rotate partially about the roll axis "x," and partially about the pitch axis "z." Regardless, because of the alignment of each of the plurality of active devices 215 with a corresponding one of the plurality of passive transducers and the u-joint 110, as described in detail above, the state of each active device compared to the state of its corresponding passive transducer remains proportional. And, as previously explained, this simplifies the computations based on the output of the passive transducers, which may then be used to generate feedback signals for controlling the active devices and the movement of the motion platform or used to protect the active devices from operating outside their intended range.

What is claimed is:

1. An apparatus comprising:
    a base;
    a motion platform;
    a pivot joint positioned between and connected to the base and the motion platform;
    a plurality of active devices, wherein each of the plurality of active devices is positioned between and connected to the motion platform at a corresponding first connection point and to the base at a corresponding second connection point, and wherein each of the plurality of active devices is capable of exerting a force on the motion platform at its corresponding first connection point; and
    a plurality of transducers, wherein each of the plurality of transducers is positioned between and connected to the motion platform at a corresponding third connection point and to the base at a corresponding fourth connection point, and wherein each of the plurality of transducers is aligned with a corresponding one of the plurality of active devices and the pivot joint such that:
    the third and fourth connection point of each of the plurality of transducers are located in a geometric plane with a pivot point associated with the pivot joint and the first and second connection points of the corresponding one of the plurality of active devices, and
    an output signal associated with each of the plurality of transducers remains proportional to the length of the corresponding one of the plurality of active devices between its first and second connection points.

2. The apparatus of claim 1, wherein at least one of the plurality of transducers is aligned between the pivot joint and the corresponding one of the plurality of active devices.

3. The apparatus of claim 2, wherein each of the plurality of transducers is aligned between the pivot joint and the corresponding one of the plurality of active devices.

4. The apparatus of claim 1, wherein each of the plurality of active devices is aligned between the pivot joint and the corresponding one of the plurality of transducers.

5. The apparatus of claim 1, wherein the pivot joint is aligned between at least one of the plurality of active devices and the corresponding one of the plurality of transducers.

6. The apparatus of claim 1, wherein the force exerted on the motion platform by one or more of the plurality of active devices cause the motion platform, by virtue of the pivot joint, to rotate about at least one of a roll axis and a pitch axis associated with the pivot joint.

7. The apparatus of claim 1 further comprising a microprocessor capable of receiving an output signal from at least one of the plurality of transducers and determining therefrom the orientation of the motion platform.

8. The apparatus of claim 1 further comprising a microprocessor capable of receiving an output signal from at least one of the plurality of transducers and determining therefrom the length of the corresponding active device and whether the corresponding active device is within its operational limits.

9. A motion platform system comprising:
    a base;
    a motion platform;
    a universal joint positioned between and connected to the base and the motion platform;
    a plurality of linear actuators, wherein each of the plurality of linear actuators is positioned between and connected to the motion platform at a corresponding first connection point and to the base at a corresponding second connection point, and wherein each of the plurality of linear actuators is capable of exerting a force on the motion platform at its corresponding first connection point; and
    a plurality of passive transducers, wherein each of the plurality of passive transducers is positioned between and connected to the motion platform at a corresponding third connection point and to the base at a corresponding fourth connection point, and wherein each of the plurality of passive transducers is aligned with a corresponding one of the plurality of linear actuators and the universal joint such that:
    the third and fourth connection point of each of the plurality of passive transducers are located in a geometric plane with a pivot point associated with the universal joint and the first and second connection points of the corresponding one of the plurality of linear actuators, and
    an output signal associated with each of the plurality of passive transducers remains proportional to the length of the corresponding one of the plurality of linear actuators between its first and second connection points.

10. The system of claim 9, wherein at least one of the plurality of passive transducers is aligned between the universal joint and the corresponding one of the plurality of linear actuators.

11. The system of claim 10, wherein each of the plurality of passive transducers is aligned between the universal joint and the corresponding one of the plurality of linear actuators.

12. The system of claim 9, wherein each of the plurality of linear actuators is aligned between the universal joint and the corresponding one of the plurality of passive transducers.

13. The apparatus of claim 9, wherein the universal joint is aligned between at least one of the plurality of linear actuators and the corresponding one of the plurality of passive transducers.

14. The system of claim 9, wherein the force exerted on the motion platform by one or more of the plurality of linear actuators cause the motion platform, by virtue of the universal joint, to rotate about at least one of a roll axis and a pitch axis associated with the universal joint.

15. The system of claim 9 further comprising a microprocessor capable of receiving an output signal from at least one of the plurality of passive transducers and determining therefrom the orientation of the motion platform.

16. The system of claim 9 further comprising a microprocessor capable of receiving an output signal from at least one of the plurality of passive transducers and determining therefrom the length of the corresponding linear actuator and whether the corresponding linear actuator is within its operational limits.

17. The system of claim 9, wherein each of the linear actuators is selected from a group of actuators consisting of pneumatic, hydraulic, electromagnetic and electromechanical linear actuators.

18. A dark ride vehicle comprising the motion platform system of claim 9.

19. The dark ride vehicle of claim 18, wherein each of the linear actuators is selected from a group of actuators consisting of pneumatic, hydraulic, electromagnetic and electromechanical linear actuators.

* * * * *